US007265176B2

(12) United States Patent
Troeltzsch et al.

(10) Patent No.: US 7,265,176 B2
(45) Date of Patent: Sep. 4, 2007

(54) COMPOSITION COMPRISING NANOPARTICLE TIO2 AND ETHYLENE COPOLYMER

(75) Inventors: Christina Troeltzsch, Beaumont, TX (US); John W. Paul, Beaumont, TX (US); Austin Henry Reid, Jr., Wilmington, DE (US); Mark David Wetzel, Newark, DE (US); Douglas Eric Spahr, Wilmington, DE (US)

(73) Assignee: E. I. du Pont de Nemours and Company, Wilmington, DE (US)

( * ) Notice: Subject to any disclaimer, the term of this patent is extended or adjusted under 35 U.S.C. 154(b) by 21 days.

(21) Appl. No.: 11/047,406

(22) Filed: Jan. 31, 2005

(65) Prior Publication Data

US 2006/0173112 A1   Aug. 3, 2006

(51) Int. Cl.
 *C08K 3/22* (2006.01)
(52) U.S. Cl. .................... 524/497; 524/897; 524/492; 524/262; 524/265; 524/261; 524/393; 524/392; 524/560; 524/562; 524/563; 524/566
(58) Field of Classification Search ............... 524/847, 524/497, 560, 563, 586, 430, 437, 261, 394, 524/322, 562, 492, 897
See application file for complete search history.

(56) References Cited

U.S. PATENT DOCUMENTS

| | | | | |
|---|---|---|---|---|
| 3,437,502 A | * | 4/1969 | Werner ..................... | 106/437 |
| 3,523,809 A | * | 8/1970 | Holbein .................... | 106/444 |
| 3,523,810 A | * | 8/1970 | Swank ...................... | 106/437 |
| 3,529,985 A | * | 9/1970 | Jester et al. ............... | 106/442 |
| 3,591,398 A | * | 7/1971 | Angerman ................ | 106/444 |
| 3,715,420 A | * | 2/1973 | Kiyono et al. ......... | 264/173.19 |
| 3,770,470 A | * | 11/1973 | Swank ................... | 106/170.58 |
| 3,847,640 A | * | 11/1974 | Daubenspeck et al. ..... | 106/443 |
| 3,897,261 A | * | 7/1975 | Allen ....................... | 106/446 |
| 3,928,057 A | * | 12/1975 | DeColibus ................. | 106/446 |
| 4,054,498 A | * | 10/1977 | Tarwid ....................... | 522/32 |
| 4,075,031 A | * | 2/1978 | Allen ....................... | 106/446 |
| 4,081,412 A | * | 3/1978 | Doroszkowski et al. .... | 106/252 |
| 4,280,849 A | * | 7/1981 | Howard et al. ............. | 106/449 |
| 4,447,271 A | * | 5/1984 | Howard et al. ............. | 106/438 |
| 4,704,510 A | * | 11/1987 | Matsui ....................... | 219/728 |
| 4,710,535 A | * | 12/1987 | Perrot et al. ............... | 524/413 |
| 4,877,819 A | * | 10/1989 | Kiyohara et al. ........... | 523/200 |
| 4,925,737 A | * | 5/1990 | Baba et al. ................ | 428/437 |
| 4,927,464 A | * | 5/1990 | Cowie ....................... | 106/436 |
| 4,992,486 A | * | 2/1991 | Feinberg ................... | 523/210 |
| 5,089,332 A | * | 2/1992 | Feinberg ................... | 428/328 |
| 5,215,580 A | | 6/1993 | Elfenthal | |
| 5,391,609 A | | 2/1995 | Knoerzer et al. | |
| 5,411,761 A | * | 5/1995 | Inokuchi et al. ........... | 427/220 |
| 5,560,845 A | * | 10/1996 | Birmingham, Jr. et al. ... | 219/121.85 |
| 5,599,529 A | | 2/1997 | Cowie | |
| 5,753,025 A | * | 5/1998 | Bettler et al. ............... | 106/442 |
| 5,820,977 A | * | 10/1998 | Shirakura et al. ........... | 428/328 |
| 5,959,004 A | * | 9/1999 | Tooley et al. ............... | 523/212 |
| 5,976,237 A | * | 11/1999 | Halko et al. ................ | 106/443 |
| 6,020,419 A | | 2/2000 | Bock et al. | |
| 6,042,937 A | * | 3/2000 | Hayashi et al. ............. | 428/323 |
| 6,342,099 B1 | * | 1/2002 | Hiew et al. ................. | 106/443 |
| 6,416,818 B1 | | 7/2002 | Aikens et al. | |
| 6,429,237 B1 | * | 8/2002 | Tooley ....................... | 523/216 |
| 6,472,445 B1 | * | 10/2002 | Takahashi et al. ........... | 521/92 |
| 6,479,576 B2 | * | 11/2002 | Eggers et al. ............... | 524/497 |
| 6,499,839 B1 | * | 12/2002 | Busby et al. ................ | 347/96 |
| 6,576,052 B1 | * | 6/2003 | Takahashi et al. .......... | 106/443 |
| 6,579,808 B2 | | 6/2003 | Kondo | |
| 6,667,360 B1 | * | 12/2003 | Ng et al. .................... | 524/492 |
| 6,669,823 B1 | | 12/2003 | Sarkas et al. | |
| 6,695,906 B2 | * | 2/2004 | Hiew et al. ................. | 106/446 |
| 6,783,586 B2 | * | 8/2004 | Bettler et al. ............... | 106/442 |
| 6,815,462 B2 | | 11/2004 | Him | |
| 6,894,089 B2 | * | 5/2005 | Mei et al. ................... | 523/212 |
| 6,962,622 B2 | * | 11/2005 | Bender et al. .............. | 106/442 |
| 7,045,200 B2 | * | 5/2006 | Murschall et al. .......... | 428/220 |
| 7,056,565 B1 | * | 6/2006 | Cai et al. .................. | 428/36.7 |
| 7,207,904 B2 | * | 4/2007 | Isogawa et al. ............. | 473/378 |
| 2001/0034397 A1 | | 10/2001 | Eggers | |
| 2002/0155059 A1 | | 10/2002 | Boulos | |
| 2005/0099975 A1 | * | 5/2005 | Catreux et al. ............. | 370/329 |
| 2005/0123761 A1 | * | 6/2005 | Hua et al. ................... | 428/404 |
| 2005/0135994 A1 | * | 6/2005 | Frerichs et al. ............. | 423/610 |
| 2005/0197428 A1 | * | 9/2005 | May ........................... | 523/210 |

(Continued)

FOREIGN PATENT DOCUMENTS

DE         1806194         * 10/1968

(Continued)

OTHER PUBLICATIONS

JP 5-132611 (abstract and translation in English).*

(Continued)

*Primary Examiner*—David W. Wu
*Assistant Examiner*—Rip A. Lee

(57) ABSTRACT

Disclosed is a composition comprising or produced from nanoparticle-sized TiO$_2$, an ethylene copolymer or ionomer of the ethylene copolymer, and optionally a second polymer. Also disclosed are films and other shaped articles produced therefrom. The composition, possessing a UV light barrier, can be used to protect the products that may be susceptible to UV such as foodstuffs.

21 Claims, No Drawings

U.S. PATENT DOCUMENTS

| | | | |
|---|---|---|---|
| 2005/0202236 A1* | 9/2005 | Busch et al. | 428/328 |
| 2005/0277709 A1* | 12/2005 | Fisher | 523/210 |
| 2005/0282946 A1* | 12/2005 | Lin et al. | 524/431 |
| 2006/0128836 A1* | 6/2006 | Honda et al. | 523/216 |

FOREIGN PATENT DOCUMENTS

| | | | |
|---|---|---|---|
| DE | 100 43 502 A1 | | 3/2002 |
| GB | 1 164 849 | * | 9/1969 |
| GB | 1 207 512 | * | 10/1970 |
| GB | 1 548 607 | | 5/1979 |
| JP | 5-132611 | * | 5/1993 |
| JP | 7-316457 | * | 12/1995 |
| JP | 2000-169749 | * | 6/2000 |
| JP | 2000-336315 | * | 12/2000 |
| WO | WO94/01498 A | * | 1/1994 |
| WO | WO 01/36529 A1 | * | 5/2001 |
| WO | WO 0245129 A2 | | 6/2002 |
| WO | WO 03040223 A2 | | 5/2003 |
| WO | WO 03040223 A3 | | 5/2003 |
| WO | WO 03099911 A1 | | 12/2003 |
| WO | WO 03106016 A1 | | 12/2003 |
| WO | WO 2004007357 | | 1/2004 |

OTHER PUBLICATIONS

JP 2000-336315 (translation in English).*
Tioxide R-TC30 product bulletin.*
JP 7-316457 (abstract and translation in English).*
JP 2000-169749 (abstract and translation in English).*
Hombitec® RM130F Product Information, Sachteben Chemie Gmbh, Sep. 2000.
PCT International Search Report for International Application No. PCT/US2006/003327 dated Jun. 7, 2006.

* cited by examiner

COMPOSITION COMPRISING NANOPARTICLE TIO2 AND ETHYLENE COPOLYMER

The invention relates to a composition comprising nanoparticle-sized $TiO_2$ (nano-$TiO_2$) and ethylene copolymer, to a process therefor, and to a product produced therefrom.

BACKGROUND OF THE INVENTION

Ethylene copolymers are also referred to as polymers comprising repeat units derived from ethylene and a polar monomer such as ethylene acid copolymers by one skilled in the art and include ionomers thereof. They are useful as packaging material. These polymers are well known to one skilled in the art and, because these polymers comprise repeat units derived from polar monomers, they have properties distinct from other polymers having no repeat units derived from polar monomers such as polyethylene, polypropylene, and other polyolefins.

It is well known that the presence of fillers in a polymer resin can improve mechanical and chemical properties of the resin. While the filler may improve the tensile strength or modulus of a resin, it may decrease the resin's toughness, elongation at break or the flex modulus. By increasing the surface area to volume, such as with nanoparticles, the amount of filler needed can be reduced, thereby reducing the negative effect of the filler, while maintaining or increasing desired property improvements.

Nanoparticulates often can access properties that the bulk material cannot, such as what wavelengths that are absorbed or transmitted. For example, titanium dioxide is a well-known white pigment (generally having a size on the order of 100 nm to 1000 nm) and can absorb and scatter light in the visible region.

Nano-$TiO_2$ particles (referring to $TiO_2$ having particle sizes on the order of about 1 to about 100 nm) can be dispersed in water while remaining transparent in appearance. While nano-$TiO_2$ is not absorbing or scattering light in the visible region, it absorbs in the UV region.

For example, WO2003/099911 discloses the incorporation of nano $TiO_2$ particles in polyolefins; U.S. Pat. No. 6,667,360 discloses the incorporation of $TiO_2$ particles in polymer resins to improve mechanical properties; and U.S. Pat. No. 6,479,576 discloses the incorporation of $TiO_2$ particles into polyethylene or ethylene copolymers.

Many packaging applications have a need for a transparent, UV barrier film. For example, a packaging material that remains clear appeals to customers. Such packaging material can be used for foods, medicines, medical devices, and cosmetics. Such UV barrier film can increase the shelf life and reduce other measures to preserve the material packaged.

Plasticized polyvinyl butyral sheet can be used in the manufacture of laminate structures such as, for example: windshields for vehicles including automobiles, motorcycles, boats and airplanes; homes and buildings; shelving in cabinets and display cases; and other articles where structural strength is desirable in a glass sheet. In many applications, it is desirable that the laminate shields undesirable UV light and/or be transparent. Additionally a variety of decorative glass laminates can be useful in a variety of applications; use of decorative glass laminates is not widespread in end-use applications such as furniture, cabinetry, countertops, tabletops, and the like.

Therefore, there is a continuing need for improving polymer properties, without sacrificing the current properties, for packaging, bottles, laminated glass, especially transparent ethylene copolymer films that exhibit a barrier to the transmission of ultra-violet light.

SUMMARY OF THE INVENTION

The invention includes a composition comprising, or produced from, a nano-$TiO_2$ and a polymer which includes an ethylene copolymer or ionomer of the ethylene copolymer, polyester, polyvinyl butyral, or combinations of two or more thereof.

Also included is a process for producing the composition.

Further included is a shaped article produced from the composition.

DETAILED DESCRIPTION OF THE INVENTION

An ethylene copolymer is a polymer that can comprise repeat units derived from about 5 to about 50%, or about 10 to about 19%, or 12 to 15%, by weight (wt %) of a polar monomer such as acrylic acid, alkyl acrylic acid, or alkyl acrylate, or combinations of two or more thereof, based on the total weight of the ethylene copolymer. The alkyl group may contain up to about 20 carbon atoms such as methyl, ethyl, butyl, isobutyl, pentyl, hexyl, and combinations of two or more thereof.

Examples of such polar monomers include acrylic acid, methacrylic acid, ethacrylic acid, methyl acrylate, ethyl acrylate, methyl methacrylate, ethyl methacrylate, propyl acrylate, propyl methacrylate, isopropyl acrylate, isopropyl methacrylate, butyl acrylate, butyl methacrylate, isobutyl acrylate, isobutyl methacrylate, tert-butyl acrylate, tert-butyl methacrylate, octyl acrylate, octyl methacrylate, undecyl acrylate, undecyl methacrylate, octadecyl acrylate, octadecyl methacrylate, dodecyl acrylate, dodecyl methacrylate, 2-ethylhexyl acrylate, 2-ethylhexyl methacrylate, isobornyl acrylate, isobornyl methacrylate, lauryl acrylate, lauryl methacrylate, 2-hydroxyethyl acrylate, 2-hydroxyethyl methacrylate, glycidyl acrylate, glycidyl methacrylate, poly(ethylene glycol)acrylate, poly(ethylene glycol)methacrylate, poly(ethylene glycol) methyl ether acrylate, poly(ethylene glycol) methyl ether methacrylate, poly(ethylene glycol) behenyl ether acrylate, poly(ethylene glycol) behenyl ether methacrylate, poly(ethylene glycol) 4-nonylphenyl ether acrylate, poly(ethylene glycol) 4-nonylphenyl ether methacrylate, poly(ethylene glycol) phenyl ether acrylate, poly(ethylene glycol) phenyl ether methacrylate, dimethyl maleate, diethyl maleate, dibutyl maleate, dimethyl fumarate, diethyl fumarate, dibutyl fumarate, dimethyl fumarate, vinyl acetic acid, vinyl acetate, vinyl propionate, and combinations of two or more thereof.

An ethylene copolymer may comprise up to 35 wt % of an optional comonomer such as carbon monoxide, sulfur dioxide, acrylonitrile; maleic anhydride, maleic acid diesters, (meth)acrylic acid, maleic acid, maleic acid monoesters, itaconic acid, fumaric acid, fumaric acid monoester, a salt of these acids, glycidyl acrylate, glycidyl methacrylate, and glycidyl vinyl ether, and combinations of two or more thereof.

The acid moiety of an ethylene copolymer may be neutralized with a cation to produce an ionomer. The neutralization, for example, can range from about 0.1 to about 100, or about 10 to about 90, or about 20 to 80, or about 20 to about 40 percent, based on the total carboxylic acid content, with a metallic ion. The metallic ions can be monovalent, divalent, trivalent, multivalent, or combinations of two or more thereof. Examples include Li, Na, K, Ag, Hg, Cu, Be, Mg, Ca, Sr, Ba, Cd, Sn, Pb, Fe, Co, Zn, Ni, Al, Sc, Hf, Ti, Zr, Ce, and combinations of two or more thereof. If the metallic ion is multivalent, a complexing agent, such as stearate, oleate, salicylate, and phenolate radicals can be included, as disclosed in U.S. Pat. No. 3,404,134.

The ionomer can also be a blend of an ionomer having a greater than 20% neutralization and, for example, an ethylene (meth)acrylic acid copolymer to achieve the desired degree of neutralization.

For example, an ethylene alkyl acrylate copolymer can comprise from 1 to 30 weight % of at least one E/X/Y copolymer wherein E comprises ethylene; X is a monomer selected from the group consisting of vinyl acetate and alkyl (meth)acrylic esters; and Y is one or more optional comonomers disclosed above; X is from 0 to 50 weight % of the E/X/Y copolymer, Y is from 0 to 35 weight % of the E/X/Y copolymer, wherein the weight % of X and Y cannot both be 0, and E being the remainder.

Examples of ethylene copolymers include, but are not limited to, ethylene/methyl acrylate (EMA), ethylene/ethyl acrylate (EEA), ethyl acrylate (EA), ethylene/butyl acrylate (EBA), ethylene/isobutyl acrylate/methacrylic acid, ethylene/methyl acrylate/maleic anhydride, ethylene/butyl acrylate/glycidyl methacrylate (EBAGMA) and ethylene/butyl acrylate/carbon monoxide (EBACO), and butylacrylate (BA).

Examples of commercially available ethylene copolymers include those available from E. I. du Pont de Nemours and Company (DuPont), Wilmington, Del., carrying the trademarks of Surlyn®, Nucrel®, Appeel®, Bynel®, and Elvaloy®, and Elvax®.

Such ethylene copolymers can be produced by any means known to one skilled in the art using either autoclave or tubular reactors (e.g., U.S. Pat. Nos. 3,404,134, 5,028,674, 6,500,888 and 6,518,365).

For example, an ethylene copolymer can be produced at high pressure and elevated temperature in a tubular reactor. The inherent consequences of dissimilar reaction kinetics for the respective ethylene and alkyl (meth)acrylate (e.g. methyl acrylate) comonomers is alleviated or partially compensated by the intentional introduction of the monomers along the reaction flow path within the tubular reactor. Such tubular reactor-produced ethylene copolymer has a greater relative degree of heterogeneity along the polymer backbone (a more blocky distribution of comonomers), reduced long chain branching, and a higher melting point than one produced at the same comonomer ratio in a high pressure stirred autoclave reactor. For additional information for tubular reactor-produced and autoclave produced ethylene copolymers, see Richard T. Chou, Mimi Y. Keating and Lester J. Hughes, "*High Flexibility EMA made from High Pressure Tubular Process*", Annual Technical Conference—Society of Plastics Engineers (2002), 60th (Vol. 2), 1832-1836. Tubular reactor produced ethylene copolymers are commercially available from DuPont. Certain such ethylene copolymers available from DuPont have a melt flow (g/10 minute) from about 0.1 to about 10 and comprise repeat units derived from an alkyl acrylate from about 5 to about 30 wt %.

Polyester is a polycondensation product of an alcohol and an organic acid or salt thereof or ester thereof. Example of polyester and production thereof has been disclosed widely such as, for example, U.S. Pat. Nos. 6,166,170; 6,075,115; 6,080,834; and 6,255,442. Because polyester is well known to one skilled in the art, the description of which is omitted herein for the interest of brevity.

Polyvinyl butyral (PVB) can be available commercially from, for example, DuPont or Solutia, St. Louis, Mo. PVB can also be manufactured according to any method known to one skilled in the art such as disclosed in U.S. Pat. No. 3,153,009, the entire disclosure of which is incorporated herein by reference. PVB resins can be prepared by mixing polyvinyl alcohol (PVA) with butyraldehyde in an aqueous medium in the presence of an acid or mixture of acids, at about 5° C. to 100° C. The ratio of PVA to butyraldehyde can depend on residual hydroxyl functionality such as, for example, about 10 to about 50, or about 15 to about 25, or about 15 to about 20, or about 17 to about 19, wt % of PVA in the total mixture. The residual wt % PVA can be determined according to ASTM D1396-92.

Nano-$TiO_2$ can be present in the composition between about 0.1 to about 50, or about 0.5 to about 30, or about 0.5 to about 10, or about 0.5 to 2 wt % (based on the total weight of the composition).

The nano-$TiO_2$ can have a mean size distribution less than or equal to about 125 nm, or $\leq$100 nm, or $\leq$50 nm, or $\leq$40 nm, or $\leq$20 nm. The nano-$TiO_2$ is preferably coated with an acid, a silicon compound, another metal oxide, or combinations of two or more thereof. The coating can be in the range of about 0.1 to about 25 wt %, or 0.1 to about 10 wt %, or about 0.3 to about 5 wt %, or about 0.7 to about 2 wt %.

The acid can be a carboxylic acid such as, for example, adipic acid, terephthalic acid, lauric acid, myristic acid, palmitic acid, stearic acid, oleic acid, salicylic acid, and ester or salt thereof.

Examples of silicon compound can be a silicate or organic silane or siloxane including silicate, organoalkoxysilane, aminosilane, epoxysilane, and mercaptosilane such as hexyltrimethoxysilane, octyltriethoxysilane, nonyltriethoxysilane, decyltriethoxysilane, dodecyltriethoxysilane, tridecyltriethoxysilane, tetradecyltriethoxysilane, pentadecyltriethoxysilane, hexadecyltriethoxysilane, heptadecyltriethoxysilane, octadecyltriethoxysilane, N-(2-aminoethyl) 3-aminopropylmethyl dimethoxysilane, N-(2-aminoethyl) 3-aminopropyl trimethoxysilane, 3-aminopropyl triethoxysilane, 3-glycidoxypropyl trimethoxysilane, 3-glycidoxypropyl methyldimethoxysilane, , 3-mercaptopropyl trimethoxysilane and combinations of two or more thereof.

Examples of metal oxides include $Al_2O_3$, $SiO_2$, $ZrO_2$, or combinations of two or more thereof.

The composition may further include plasticizers, optical brighteners, adhesion promoters, stabilizers (e.g., hydrolytic stabilizers, radiation stabilizers, thermal stabilizers, and ultraviolet (UV) light stabilizers), antioxidants, ultraviolet ray absorbers, anti-static agents, colorants, dyes or pigments, delustrants, fillers, fire-retardants, lubricants, reinforcing agents (e.g., glass fiber and flakes), processing aids, anti-slip agents, slip agents (e.g., talc, anti-block agents), and other additives.

Nano-$TiO_2$ can be commercially available or produced by any means known to one skilled in the art such as that disclosed in U.S. Pat. No. 6,667,360. Phosphoric acid, metal phosphate, metal halide, metal carbonate, metal sulfate, or combinations of two or more thereof can be used to control the crystallinity, amorphous content, or millability of the nano-$TiO_2$. The metal can be sodium, potassium, aluminum, tin, or zinc. Surface reactivity of the particles can also be controlled by coating with a surface agent such as metal oxide, an acid, or silane as disclosed above.

The composition comprising an ethylene copolymer can be produced using any methods known to one skilled in the art. An ethylene copolymer and nano-TiO2 can be dry mixed, dry blended, melt blended, and other methods known to one skilled in the art. For example, incorporating nano-$TiO_2$ into an ethylene copolymer or polyvinyl butyral can be accomplished utilizing both powder and slurries. A slurry or dry powder of $TiO_2$ can be into an ethylene copolymer in an autoclave reactor containing the copolymer. The copolymer can be a base resin or a desired ionomer. Introduction can be made either in a Roll Mill or extruder, and as a masterbatch in the desired material or direct compositions. Alternatively, a roll mill can be used to produce a masterbatch in an extruder with a wt % of nano-$TiO_2$ between 10 to 30 followed by extrusion to between 0.5 to 2 wt % while neutralized from about 10 to about 90 percent with metallic ions based on the total carboxylic acid content. Also alternatively, a powder nano-$TiO_2$ can be added to a desired ionomer in an extruder by a masterbatch with a wt % of nano $TiO_2$ between 10 to 30 followed by extrusion to between 0.5 to 2 wt %.

The composition can also comprise a plasticizer. Plasticizers can be those known to one skilled in the art. For example, the plasticizer used in producing plasticized PVB sheeting can include triethylene glycol di-(2-ethylhexanoate), tetraethylene glycol di-heptanoate, di-butyl sebacate, or combinations of two or more thereof.

Plasticizer can be included in any amount, such as about 5 to about 50 parts per hundred (pph) resin, or about 20 to about 45 pph, or about 32 to about 45 pph, based upon the total dry weight of the resin. Plasticization can be carried out using any known processes such as disclosed in U.S. Pat. Nos. 3,153,009 or 5,886,075.

The composition can also comprise a filler such as $CaCO_3$, $SiO_2$. $Al_2O_3$, regular particle-sized $TiO_2$, $ZrO_2$, or combinations of two or more thereof. A filler can be present in the composition in the range of about 0.01 to about 5 wt %.

A surfactant can also be included the composition, especially in a PVB composition. Any known surfactant can be used, for example, sodium lauryl sulfate, sodium dioctyl sulfosuccinate, sodium cocomethyl tauride, or decyl(sulfophenoxy)benzenesulfonic acid disodium salt.

A shaped article can be produced from the composition. The shaped article may be in the form of films, sheets, filaments, tapes, molded products, thermoformed products, containers, and the like. Processes for producing these products are well known to one skilled in the art. For example, films can be produced by nay methods known to one skilled in the art such as, for example, solution casting cast film extrusion, blown film extrusion, and thermoplastic film forming (e.g., calendaring or stretching). Because such methods are well known to one skilled in the art, the description of which is omitted herein for the interest of brevity.

Films can also be multilayer films produced by coextrusion or laminations. For example, a multilayer polymer film can involve two or more layers including an outermost structural or abuse layer, an inner barrier layer, and an innermost layer making contact with and compatible with the intended contents of the package and capable of forming seals necessary for enclosing the product to be contained within the package. A film containing nano-$TiO_2$ can also be adhesive-laminated to a film or layer made from, or coextruded with materials such as nylon, polypropylene, polyethylene, ionomer, another ethylene copolymer, polyamide, polyethylene terephthalate, polystyrene, and/or polyethylene vinyl alcohol. For example, a multilayer film can comprise the nano-$TiO_2$ composition as tie (adhesive or sealant) layer with polyethylene as outmost layer.

The films can be used to make a container, which is a shaped article for use in packaging and includes box, blister pack, bottle, tray, cup, and other containers. Containers can be used for beverages, foods (e.g., meats, cheese, fish, poultry, nuts, and other edible items), spices, condiments, personal care products, fragrances, electronic components, medical devices, medicinal liquids, pharmaceuticals, and cosmetics.

A glass laminate can comprise at least one piece of glass adhered with a layer of film or interlayer produced from a composition comprising PVB and nano-$TiO_2$. A glass laminate can optionally include other interlayer materials such as those that are known and used conventionally as interlayers in transparent laminates. A glass laminate can be any combination of glass laminated to glass (glass/glass), glass/plastic, plastic/plastic, or other multilayers. Other combinations of glass or plastic, or glass and plastic, can include metals, wood, or stone. An adhesive layer may be used. Such glass laminate can be very useful such as the production of decorative articles in cabinets, cabinet doors, tabletops, table covers, countertops, entry doors, door panels, shower doors, floor tiles, ceiling tiles, wall tiles, stair treads, wall backsplash, appliance doors, appliance covers, room dividers, shelving, and cabinets. Such glass laminate can be produced, for example, by layering a glass sheet and another glass sheet or a plastic sheet or film together under heat and pressure to form the laminate, or by co-extruding PVB with a filler and a plasticizer. The extrusion can be carried out at a temperature about 175° C. to about 245° C. The extruded sheet can be quenched, or cooled, to a below about 40° C. and above about 10° C.

The following examples are provided to further illustrate, but are not to be construed as to unduly limit the scope of, the invention.

EXAMPLE 1

The example was prepared by powder addition of nano-$TiO_2$ into a twin screw extruder. The nano-$TiO_2$ was obtained from Sachtleben Chemie Gmbh, Duisburg, Germany, had a mean crystallite size of about 15 nm, and was coated with $Al_2O_3$ and stearic acid. A masterbatch of 10 wt % $TiO_2$ in 15 wt % methacrylic acid/ethylene ionomer having 58% of carboxylic acid groups neutralized was produced, then let down (diluted) to 0.5, 1, and 2 wt % samples by blending with more ionomer. The samples were collected as pellets and then blown into film. The film haze (ASTM-D-1003 method) and UV absorbance was measured (Table 1). Haze was measured by a Gardner Hazemeter Model UX10 and is defined in ASTM Standard as n-scattering of light at the glossy surface of a specimen responsible for the apparent reduction in contrast of objects viewed by reflection from the surface.

TABLE 1

| % $TiO_2$ | % absorbency below 350 nm | Haze |
|---|---|---|
| 0 | 0 | 1.6 |
| 0.5 | 45 | 12.6 |
| 1 | 80 | 38.5 |
| 2 | 100 | 33.0 |

EXAMPLE 2

This example was prepared by addition of 10 wt % nano-$TiO_2$ to 15 wt % methacrylic acid/ethylene copolymer as a masterbatch. The masterbatch was then treated with ZnO to neutralize 58% of carboxylic groups and let down to 0.5 and 1 wt % samples with more ionomer as in Example 1. The samples were then blown to films and the haze of the film was measured as disclosed in Example 1. The results are shown in Table 2.

TABLE 2

| | $TiO_2$ (%) | | |
|---|---|---|---|
| | 0 | 0.5 | 1 |
| Haze | 2.4 | 11.3 | 17.5 |

EXAMPLE 3

The material in this example were prepared by directly injecting a slurry of nano-$TiO_2$ into an autoclave reactor, a high pressure pilot unit, during a polymerization process to produce ethylene methacrylic acid copolymer that contained the nano-$TiO_2$. The polymer containing nano$TiO_2$ produced was treated as a masterbatch and diluted to 0.5 and 1 wt % (nano-$TiO_2$) samples with ethylene methacrylic acid copolymer that did not contain nano-$TiO_2$.

TABLE 3

| | $TiO_2$ (%) | | |
|---|---|---|---|
| | 0 | 0.5 | 1 |
| Haze | 1.9 | 7.5 | 11.8 |

The invention claimed is:

1. A composition comprising or produced from nano-$TiO_2$, a first polymer, and optionally a second polymer wherein
   the first polymer is polyvinyl butyral, an ethylene copolymer, an ionomer of the ethylene copolymer, or combinations of two or more thereof;
   the nano-$TiO_2$ is coated with a silicon compound, a metal oxide, and optionally an acid or its derivative;
   the acid is adipic acid, terephthalic acid, lauric acid, myristic acid, palmitic acid, stearic acid, oleic acid, salicylic acid, or combinations of two or more thereof, the derivative is ester or salt of the acid;
   the silicon compound is silicate, organoalkoxysilane, aminosilane, epoxysilane, mercaptosilane, $SiO_2$, or combinations of two or more thereof;
   the metal oxide includes $Al_2O_3$, $ZrO_2$, or combinations thereof;
   the ethylene copolymer comprises repeat units derived from ethylene and a polar monomer;
   the polar monomer is acrylic acid, methacrylic acid, alkyl ester of acrylic acid, alkyl ester of methacrylic acid, salt of acrylic acid, salt of methacrylic acid, or combinations of two or more thereof;
   the particle size of the nano-$TiO_2$ is $\leq 100$ nm; and,
   provided that, if the first polymer is polyvinyl butyral, nano-$TiO_2$ is present in the composition from about 0.5 to about 10 weight % of the composition.

2. The composition of claim 1 wherein the ethylene copolymer further comprises repeat units derived from a comonomer comprising carbon monoxide, sulfur dioxide, acrylonitrile, maleic anhydride, maleic acid diesters, maleic acid, maleic acid monoesters, itaconic acid, fumaric acid, fumaric acid monoester, a salt of one of these acids, glycidyl acrylate, glycidyl methacrylate, glycidyl vinyl ether, or combinations of two or more thereof.

3. The composition of claim 1 wherein the polar monomer is acrylic acid, methacrylic acid, methyl acrylate, methyl methacrylate, or combinations of two or more thereof and the particle size of the nano-$TiO_2$ is $\leq 50$ nm.

4. The composition of claim 3 further comprising repeat units derived from carbon monoxide, sulfur dioxide, acrylonitrile, maleic acid, maleic anhydride, maleic acid diesters, maleic acid monoesters, itaconic acid, fumaric acid, fumaric acid monoester, a salt of any of these acids, glycidyl acrylate, glycidyl methacrylate, glycidyl vinyl ether, or combinations of two or more thereof.

5. The composition of claim 3 wherein the polar monomer is methacrylic acid, or acrylic acid, or both and the nano-$TiO_2$ is further coated with the acid or its derivative.

6. The composition of claim 5 comprising or produced from the nano-$TiO_2$ and the ethylene copolymer.

7. The composition of claim 5 comprising or produced from the nano-$TiO_2$ and the ionomer of the ethylene copolymer.

8. The composition of claim 6 comprising about 0.5 to 10 wt % of nano-$TiO_2$ and the nano-$TiO_2$ is coated with $Al_2O_3$, $SiO_2$, and stearic acid.

9. The composition of claim 7 comprising about 0.5 to 10 wt % of nano-$TiO_2$ and the nano-$TiO_2$ is coated with $Al_2O_3$, $SiO_2$, and stearic acid.

10. A shaped article comprising or produced from a composition wherein
    the composition comprises or produced from nano-$TiO_2$, first polymer, and optionally a second polymer;
    the first polymer is polyvinyl butyral, an ethylene copolymer, an ionomer of the ethylene copolymer, or combinations of two or more thereof;
    the nano-$TiO_2$ is coated with a silicon compound, a metal oxide, and optionally an acid or its derivative;
    the acid is adipic acid, terephthalic acid, lauric acid, myristic acid, palmitic acid, stearic acid, oleic acid, salicylic acid, or combinations of two or more thereof and the derivative is an ester or salt;
    the silicon compound is silicate, organoalkoxysilane, aminosilane, epoxysilane, mercaptosilane, $SiO_2$, or combinations of two or more thereof;
    the metal oxide includes $Al_2O_3$, $ZrO_2$, or combinations of thereof;
    the ethylene copolymer comprises repeat units derived from ethylene and a polar monomer;
    the particle size of the nano-$TiO_2$ is $\leq 100$ nm; and provided that, if the first polymer is polyvinyl butyral, nano-$TiO_2$ is present in the composition from about 0.5 to about 10 weight % of the composition; and
    the polar monomer is methacrylic acid, or acrylic acid, or both.

11. The article of claim 10 wherein the composition comprises or is produced from the nano-$TiO_2$ and the ethylene copolymer and the nano-$TiO_2$ is further coated with the acid or its derivative.

12. The article of claim 10 wherein the composition comprises or is produced from the nano-$TiO_2$ and the ionomer of the ethylene copolymer and the nano-$TiO_2$ is further coated with the acid or its derivative.

13. The article of claim 10 wherein the composition comprises or produced from about 0.5 to 10 wt % of nano-$TiO_2$ and the ethylene copolymer; and the nano-$TiO_2$ is coated with $Al_2O_3$, $SiO_2$, and stearic acid.

14. The article of claim 10 wherein the composition comprises or is produced from about 0.5 to 10 wt % of nano-$TiO_2$ and the ionomer of the ethylene copolymer; and the nano-$TiO_2$ is coated with $Al_2O_3$, $SiO_2$, and stearic acid.

15. The article of claim 10 wherein the article is a film.

16. The article of claim 13 wherein the article is a film.

17. The article of claim 14 wherein the article is a film.

18. The article of claim 10 wherein the first polymer is polyvinyl butyral and the article is a glass laminate.

19. A container comprising or produced from a film wherein the film comprises or is produced from a composition;

the composition comprises or produced from nano-$TiO_2$, a first polymer, and optionally a second polymer;

the first polymer is polyvinyl butyral, an ethylene copolymer, an ionomer of the ethylene copolymer, or combinations of two or more thereof;

the particle size of the nano-$TiO_2$ is $\leqq 100$ nm;

the nano-$TiO_2$ is present from about 0.5 to about 30 weight % of the composition and is coated with an acid or its derivative, a silicon compound, and a metal oxide; the acid is adipic acid, terephthalic acid, lauric acid, myristic acid, palmitic acid, stearic acid, oleic acid, salicylic acid, or combinations of two or more thereof; the silicon compound is silicate, organoalkoxysilane, aminosilane, epoxysilane, mercaptosilane, or combinations of two or more thereof; metal oxides include $Al_2O_3$, $ZrO_2$, or combinations thereof; and the ethylene copolymer comprises repeat units derived from ethylene and a polar monomer; the polar monomer is acrylic acid, methacrylic acid, alkyl ester of acrylic acid, alkyl ester of methacrylic acid, salt of acrylic acid, salt of methacrylic acid, or combinations of two or more thereof.

20. The container of claim 19 further comprising beverage, food, spice, condiment, personal care product, fragrance, electronic component, medical device, medicinal liquid, pharmaceutical, cosmetic, or combinations of two or more thereof.

21. The container of claim 20 wherein the container is a bottle.

* * * * *